Figure 1:
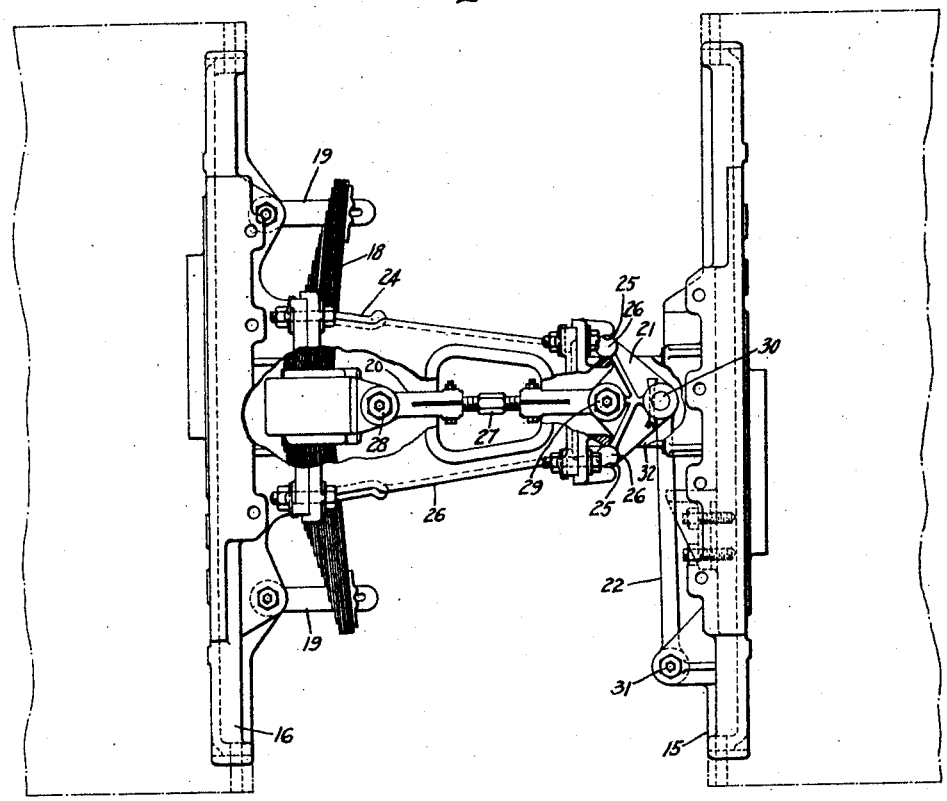

Sept. 17, 1929.  O. K. KJOLSETH  1,728,831
RESTRAINING DEVICE
Filed March 31, 1928

Inventor:
Ole K. Kjolseth,
by Charles E. Tullar
His Attorney.

Patented Sept. 17, 1929

1,728,831

UNITED STATES PATENT OFFICE

OLE K. KJOLSETH, OF SCOTIA, NEW YORK, ASSIGNOR TO GENERAL ELECTRIC COMPANY, A CORPORATION OF NEW YORK

RESTRAINING DEVICE

Application filed March 31, 1928. Serial No. 266,304.

My invention relates generally to trucks for locomotives or cars and more particularly to restraining devices for resiliently resisting turning of a truck relative to an under frame of a locomotive or car.

In constructing locomotives or cars pivoted guiding trucks are usually provided to resist swaying or "nosing" of the platform structure at high speeds and also to facilitate traversing a curve in the track by exerting a turning moment on the front end of the frame. Restraining devices have been used on these guiding trucks which tended to maintain the wheels of the same in alignment with the frame and the other wheels of the locomotive or car. These devices have generally included coil springs and a lever mechanism arranged to resist turning of the guiding or other pivoted trucks on their supports in rounding a curve and to return them to a position with the wheels in alignment with the rails and the other wheels when the locomotive or car passed to a straight portion of the track. A coil spring produces a force substantially proportional to its deflection and when the force causing the deflection is removed the spring returns quickly to a position of equilibrium because there is nothing to retard its action. As a result, these restraining devices have not suppressed swaying or "nosing" of the locomotive at high speeds but have exaggerated it for the reason that when the trucks were turned out of alignment with each other the force exerted by the coil springs tending to return them to a position in alignment became large and accelerated their movement which caused them to swing past this position and oscillate relative to the frame of the locomotive or car before coming to rest. Moreover, in instances in which the pivoted trucks have been provided with driving motors, these restraining devices have not provided any means for preventing longitudinal tilting of the trucks caused by the torque applied to the wheels. This tended to raise one end of the truck from the track which resulted in slipping of the wheels due to uneven loading and a consequent loss of tractive effort.

The primary object of my invention is to provide a restraining device for resisting turning of the guiding or pivoted trucks relative to the frame of the locomotive or car which will resiliently maintain the truck wheels in longitudinal alignment of the under-frame of the locomotive or car and resist oscillation of these trucks on their supports.

A further object of my invention is to provide a restraining device of this character which will also suppress longitudinal tilting of the guiding or pivoted trucks relative to the frame.

I accomplish these objects by utilizing a leaf spring with a suitable lever mechanism for restraining the turning of the pivoted or guiding truck from its position in alignment with the frame, and arrange a support for the lever mechanism so as to restrict longitudinal tilting of the truck relative to the frame.

My invention will be more fully set forth in the following description referring to the accompanying drawing, and the features of novelty which characterize my invention will be pointed out with particularity in the claims annexed to and forming a part of this specification.

Figure 2:
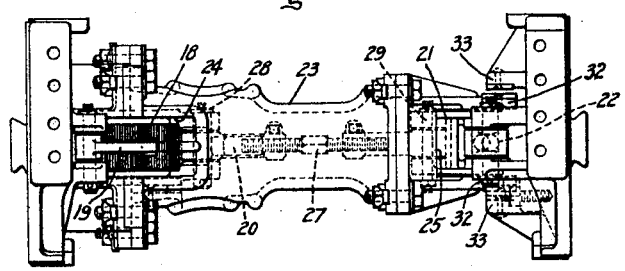
Figure 3:
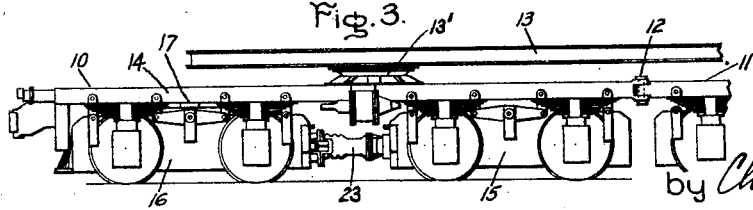

In the drawing, Fig. 1 is a plan view of my improved restraining device as applied to a locomotive or car between a fixed and a pivoted truck thereof; Fig. 2 is a side elevation of the construction shown in Fig. 1, and Fig. 3 is a side elevation of a locomotive or car having my restraining device applied thereto.

Referring to the drawing, the locomotive or car in connection with which I have shown my invention comprises two similar units 10 and 11 (Fig. 3) which are articulated at 12 and which support the usual platform 13 thereon by a center plate 13'. The unit 10 comprises a main frame 14 which is supported on a two-axle, motor driven truck 15 rigidly connected thereto and a two-axle, motor driven truck 16 which is pivoted at 17 on the frame 14. By this construction the trucks can turn relative to each other as required in traversing a curve in the track.

When a locomotive or car of this type is operated at high speed the movable or pivoted guiding truck 16 tends to oscillate on its support, due to unevenness in the track, which sets up objectionable swaying or "nosing" of the platform structure on the trucks. Moreover, the movable trucks tilt longitudinally of the platform and cause uneven loading of the wheels which results in slipping of the wheels and a loss of tractive effort. This swaying of the platform structure is objectionable because it subjects the track to excessive lateral stresses, causes wearing of the wheel flanges, and makes riding in the locomotive or car uncomfortable. In accordance with my invention the movable trucks are prevented from causing this objectionable swaying by a restraint device for resiliently maintaining the trucks in alignment, of such characteristics that the force exerted thereby tending to restore the truck to a position in alignment is retarded in its action. These characteristics are obtained by the use of a leaf spring in which the friction between the leaves thereof retards any change in the deflection thereof to such an extent that oscillation of the movable truck on its support is prevented. In the particular embodiment of my invention illustrated by way of example, the restraining device comprises a leaf spring 18 mounted on the movable truck 16 by links 19, and a lever mechanism connected to the mid-portion of the spring and to the rigid truck 15, although if the particular construction makes it convenient, the lever mechanism can be connected to the main frame of the locomotive or car. In the present construction this lever mechanism includes a tension bar 20, a rocker 21 and a link 22 which are supported on a hollow radius bar 23 bolted to the truck 16. The radius bar 23 is formed with lateral openings 24 through which the spring 18 extends and is formed adjacent the outer end thereof with seats 25 adapted to engage trunnions 26 formed on the rocker 21, so that turning of the rocker in either direction unseats one of the trunnions 26. The tension bar 20, which is provided with a turnbuckle 27 for adjusting the length of the same, is connected at 28 to the mid-portion of the spring 18, and to the rocker 21 at 29 between the trunnions 26. This tension bar is initially adjusted to subject the spring 18 to a bending stress so that the trunnions 26 of the rocker are normally maintained in engagement with the seats 25. By this construction when the rocker 21 is turned from its normal position in either direction one of the trunnions is raised from its seat which increases the tension in the bar 20 and deflects the spring 18. When the forces causing the deflection of the spring are diminished, the friction between the leaves of the spring 18 causes it to change deflection slowly and prevents the rocker 21 from rocking back and forth on the trunnions and setting up oscillation of the movable truck. Moreover, the trunnions 26 and the connection 29 for the tension bar 20 are arranged so as to decrease the distance from the axis of the tension bar to the trunnions at the same rate as the force of the spring increases when the rocker is turned in either direction from its normal position shown, in which both of the trunnions engage their seats. In this way the restoring moment tending to move the rocker to its normal position is made the same for all positions on either side of the normal position so that rocking of the rocker 21 on the trunnions 26 and oscillation of the movable truck on its support is avoided.

The link 22, which is pivotally connected to the rocker 21 and the frame of the rigid truck 15 at 30 and 31 respectively, is made of such length that when the rigid and movable trucks are in longitudinal alignment the trunnions 26 of the rocker are both in engagement with their seats 25. Upon turning of the movable truck relative to the rigid truck, the rocker is turned by the link 22 on one of the trunnions so that the other is unseated, which increases the load on and deflects the spring 18, which resiliently resists turning of the movable truck out of alignment with the rigid truck.

In order to avoid longitudinal tilting of the trucks relative to each other, which would cause uneven loading of the truck wheels and slippage resulting in a loss of tractive effort the radius bar 24, which is rigidly connected to the movable truck 16, is provided with an extension 32 arranged between abutments 33 carried by the rigid truck or any other portion of the frame of the locomotive or car. The abutments 33 are spaced apart so as to permit the radius bar to turn with the movable truck and extend on opposite sides of the radius bar in its normal mid-position far enough to restrict its vertical movement in all positions of the movable truck.

It will thus be seen that I have provided a restraining device for resiliently maintaining trucks of a locomotive or car in longitudinal alignment without setting up oscillation of the movable trucks on their supports and that I have also arranged the restraining device so as to prevent longitudinal rocking of the trucks and the platform structure supported thereon.

Modifications of the form of my invention which I have disclosed will occur to those skilled in the art, so that I do not desire to be limited to the particular arrangement shown and described except as defined in the appended claims.

What I claim as new and desire to secure by Letters Patent of the United States is:

1. A restraining device including a radius bar, a leaf spring at one end of said radius bar, and means including a lever mechanism carried by the other end of said radius bar and connected to said spring for subjecting the same to a bending stress.

2. In combination with a locomotive or car having a frame and a truck movably connected thereto, means for resiliently resisting turning of said truck relative to said frame and for resisting oscillation of said truck relative to said frame, said resilient means including a radius bar, a leaf spring connected to said truck, and a lever mechanism connected to said spring for subjecting the same to a bending stress.

3. In combination with a locomotive or car having a frame and a truck movably connected thereto, means including a spring for resiliently resisting turning of said truck relative to said frame and for resisting oscillation of said truck relative to said frame, said resilient means including a supporting member connected to the ends of said spring and a lever mechanism having a rocker engaging said supporting member and connected to said spring intermediate the ends thereof for subjecting the same to a bending stress.

4. In combination with a locomotive or car having a frame and a truck movably connected thereto, means for resiliently resisting turning of said truck relative to said frame and for restricting longitudinal tilting of said truck relative to said frame, said resilient means including a radius bar slidably connected between said truck and said frame and a leaf spring carried by said truck.

5. In combination with a locomotive or car having a frame and a guiding truck movably connected thereto, a radius bar rigidly secured to said truck, means connected to said frame for restricting vertical movement of said radius bar to prevent longitudinal tilting of said truck, a leaf spring carried by said movable truck, and a lever mechanism connected to said spring and to said frame for resiliently resisting turning of said truck relative thereto and for resisting oscillation of said truck relative to said frame.

6. In combination with a locomotive or car having a frame with a truck rigidly connected thereto and a guiding truck movably connected thereto, means for resiliently resisting turning of said truck relative to said frame and for restricting longitudinal tilting of said trucks relative to each other, said means including a radius bar rigidly connected to said movable guiding truck and slidably engaging said rigid truck so as to restrict longitudinal tilting of said trucks relative to each other.

7. In combination with a locomotive or car having a frame with a truck rigidly connected thereto and a guiding truck movably connected thereto, a radius bar rigidly secured to said movable guiding truck and slidably engaging said rigid truck so as to restrict longitudinal tilting of said trucks relative to each other, a leaf spring carried by said movable truck, and a lever mechanism connected to said spring and to said rigid truck for resisting turning of said guiding truck relative to said frame and for resisting oscillation of said guiding truck relative to said frame.

8. In combination with a locomotive or car having a frame with a truck rigidly connected thereto and a guiding truck movably connected thereto, a radius bar rigidly secured to said movable guiding truck and slidably engaging said rigid truck so as to restrict longitudinal tilting of said trucks relative to each other, a leaf spring connected at the ends thereof to said radius bar, and a lever mechanism connected to said spring intermediate the ends thereof for resiliently maintaining said guiding truck in longitudinal alignment with said frame and for damping out rapid oscillation of said guiding truck relative to said frame, said lever mechanism including a rocker bearing on said radius bar and connected to said rigid truck.

In witness whereof, I have hereunto set my hand this 30th day of March, 1928.

OLE K. KJOLSETH.